US005957163A

United States Patent [19]

Ito et al.

[11] Patent Number: 5,957,163

[45] Date of Patent: Sep. 28, 1999

[54] HOSE WITH STICKING LAYER AND CONNECTING STRUCTURE THEREOF

[75] Inventors: Tomohide Ito; Hirokazu Kitamura, both of Kasugai, Japan

[73] Assignee: Tokai Rubber Industries, Ltd., Aichi, Japan

[21] Appl. No.: 08/625,318

[22] Filed: Apr. 1, 1996

[30] Foreign Application Priority Data

Oct. 6, 1995 [JP] Japan .................................... 7-259146
Nov. 27, 1995 [JP] Japan .................................... 7-307027

[51] Int. Cl.[6] ........................................................ F16L 9/00

[52] U.S. Cl. .................... 138/109; 138/137; 138/DIG. 1; 285/382.4

[58] Field of Search .................................... 138/109, 137, 138/140, DIG. 1, 141; 285/187, 382.4, 423, 21.2, 21.3

[56] References Cited

U.S. PATENT DOCUMENTS 2,315,225 3/1943 Rogers .................................... 285/239
5,090,745 2/1992 Kluger .

FOREIGN PATENT DOCUMENTS 0 699 861 A2 3/1996 European Pat. Off. .
40 39 054 5/1992 Germany .
7-96564 4/1995 Japan .
1 204 971 9/1970 United Kingdom .
PCT/JP96/00735 3/1996 WIPO .

*Primary Examiner*—Patrick Brinson
*Attorney, Agent, or Firm*—Armstrong, Westerman, Hattori, McLeland & Naughton

[57] ABSTRACT

A hose with a sticking layer, whose end is connected to an inserting section of a cylindrical member and which is provided with a resin hose main body composed of a resin layer having a monolayered structure or a multilayered structure and with a sticking layer mainly containing rubber or resin applied to at least an inner circumference of one end or both ends of the resin hose main body, and its connecting structure are provided.

25 Claims, 9 Drawing Sheets

HOSE WITH STICKING LAYER AND CONNECTING STRUCTURE THEREOF

TECHNICAL FIELD

The present invention relates to an elastic hose, which is connected to a piping equipment, such as a pressure regulator and a fuel strainer provided around an engine, a fuel tank, etc. of a car directly or through a connecting coupling, such as a quick connector, and relates to a connecting structure between the elastic hose and a tubular member, such as a piping equipment and a connecting coupling.

BACKGROUND OF THE INVENTION

Conventionally, as a hose, which is connected to a piping equipment, such as a pressure regulator and a fuel strainer of a car, or a hose, such as fuel hose of a car engine, which is mounted to a car, an elastic hose wholly made of rubber or an elastic hose having a rubber layer in at least its one portion has been usually used. Moreover, it is desired that such elastic hoses do not require removing in use for maintenance after being connected to a piping equipment, namely, a maintenance-free elastic hose is desired. For this reason, such an elastic hose has a tendency to be connected so that it cannot be removed by an usual method.

Further, recently, in order to attempt to reduce cost, a resin hose is used instead of a conventional rubber hose and a hose having a rubber layer, However, since the resin hose does not have sufficient elasticity compared with the rubber hose, it has an disadvantage such as insufficient sealing on a connecting portion with a cylindrical member. Moreover, in order to provide a maintenance-free resin hose, it is necessary to securely connect the resin hose to the cylindrical member so that they cannot be removed. However, since permanent set in fatigue is liable to occur in the resin hose, there arises another problem from this point of view.

Therefore, conventionally, a coupling unit intervenes between an elastic hose, such as a fuel hose and a piping equipment, such as a pressure regulator and a fuel strainer, and the hose is stuck to the one end of the coupling unit so as that they cannot be removed. For example, as shown in FIG. 1, an inserting section 31 of connecting fittings 30, such as a flare coupling, is inserted into one end 11 of an elastic hose 10, and they are previously cramped by a fastener, such as a sleeve 35 and secured so that they cannot be removed each other in a hose manufacturing factory, Thereafter, a nut-like coupling section 32 on the opposite side to the insert section 31 of the connecting fittings 30 is connected to a metallic pipe 20, such as a fuel strainer, and secured by a sleeve-like clamp screw 33 or the like in an auto assembly plant. Here, 12 in the drawing is a reinforcing layer composing a reinforcing system.

In addition, in recent years, the complicated coupling unit mentioned above is not used, but a connecting coupling, such as a quick connector, which can be easily connected to a tubular member for connecting hose with one step, is frequently used. Furthermore, there is a great demand for a reduction in cost recently and thus it is unavoidable to decrease a number of parts. Therefore, in the case where a hose is connected to an equipment, it is attempted to directly connect the elastic hose, such as the fuel hose, to a metallic pipe or the like provided to a piping equipment, such as a fuel strainer, without intervention of a coupling unit.

For example, as shown in FIG. 2, one end 11 of an elastic hose 10 is directly inserted into an inserting section 21 of a metallic pipe 20 provided to a piping equipment, such as a fuel strainer mounted to a car, and various fasteners, such as a clip 42 is installed to the outer circumference of the one end 11 of the elastic hose 10 so that the elastic hose 10 closely secured to the metallic pipe 20, etc. and secured, As the fastener, besides the clip 42 shown in the drawing whose zonal elastic body is formed so as to have a ring shape and which fastens the elastic hose 10 securely by utilizing elastic force due to decrease in a diameter, and a band or the like for fastening both the ends of a fastening member by means of securing means, such as a bolt and a nut and decreasing a diameter is known. 22 in the drawing is a ring convex portion provided to the circumferential surface of the inserting section 21 of the metallic pipe 20 for preventing the hose from coming off.

These conventional methods use the fastener, but when the fastener is used for a long time, the hose is deteriorated due to heat, and thus securing force of the end of the elastic hose fastened by the fastener is decreased. As a result, the fastener does not suitably work, and thus sealing might be lowered. Moreover, the use of the fastener might cause a notch, a crack, etc. on the ends of the elastic hose to which the fastener is attached.

Meanwhile, Japanese Unexamined Utility Model Publication No. 61-96075/1986 (Jitsukaisho 61-96075) discloses a hose terminal protection cap made of an elastomer material of a ring cylinder with bottom, which surrounds an end face and outer and inner face of a hose terminal. This hose terminal protection cap is inserted into the hose terminal so that a notch and a crack is caused in the hose when the hose connected to a pipe or the like is fastened by a fastener. However, the protection cap is a molded product, which is separately produced from the hose, it is thick and is not fastened to the hose, so it is liable to remove from the hose terminal.

In addition, Japanese unexamined Utility Model Publication No. 57-25292/1982 (Jitsukaisho 57-25292) discloses a metallic piping coupling whose outer surface of a connecting portion is coated with silicone rubber or fluororubber and which is connected to a flexible tube. However, when the coupling is pressed into a hose terminal, a ring convex portion on an outer circumference of the coupling is rubbed with an inner circumference of the hose until the end of the insertion, and thus a coating layer of the ring convex portion is partially worn out, so sealing properties between the hose and the coupling are liable to damage. Moreover, since the ring convex portion is on the outer circumference of the coupling, it is difficult to apply a coating layer uniformly to the coupling, and particularly the top part of the ring convex portion is liable to be thin. For this reason, the sealing properties are further lowered, and the sealing properties are not constant, so quality control becomes difficult.

Furthermore, in the connecting structure of the piping coupling and the hose, in the case where the sealing properties are damaged in use, the original sealing properties cannot be maintained without replacement of both the hose and the piping coupling. This is because since securing force of the hose is lowered due to plastic deformation in pressing the hose into the coupling and to thermal degradation in using the hose, when the hose is reused, it does not have its original repulsion force, and thus the hose and the coupling do not come closely into contact. On the other hand, when the coating layer formed on the outer circumference of the coupling is once used by connecting it to the hose, it is stuck to the hose due to heat and a secular change, and it is not easy to completely remove the coating layer.

SUMMARY OF THE INVENTION

It is an object of the present invention to provide a a hose with a sticking layer, where in the case where a resin hose or an elastic hose is connected to a piping equipment, such as a fuel strainer around a car engine, reduction in costs can be realized by omitting a fastener, and excellent sealing properties can be maintained for a long time in order to sufficiently respond to the demands of maintenance-free when the hose is connected to a pipe and a connecting coupling of the piping equipment without using a fastener, and it the sealing properties are lost in using, the excellent sealing properties can be recovered by at least replacement of the hose, and to provide a connecting structure where the hose with a sticking layer is connected to the pipe of the piping equipment directly or by means of a connecting coupling.

In order to achieve the above object, the resin hose of the present invention, as shown in one concrete example of FIG. 3, for example, is a resin hose 1 with a sticking layer characterized by having a resin hose main body 2 composed of a resin layer with a monolayered structure or a multilayered structure, and a sticking layer 3, which is mainly contains rubber or resin for sticking the resin hose to a cylindrical member, and is applied to at least an inner circumference of one end 2*a* or both ends 2*a* of the resin hose main body 2.

Moreover, a connecting structure of a resin hose according to the present invention as shown in one concrete example in FIG. 4, for example, is composed of the resin hose 1 with a sticking layer and the cylindrical member 4 having a ring convex section 41*a* on an outer circumference of its inserting section 41. The connecting structure is characterized in that the end 2*a* having the sticking layer 3 on at least an inner circumference of the resin hose 1 is inserted into the inserting section 41 of the cylindrical member 4, and that the end 2*a* of the resin hose 1 is stuck to the inserting section 41 of the cylindrical member 4 by the sticking layer 3.

Furthermore, the elastic hose of the present invention, which has an innermost layer made of resin and whose end is connected to a tubular member for connection of a hose, is characterized by having a sticking layer mainly containing rubber or resin, which was applied to at least an inner circumference of one end or both ends of the elastic hose.

In addition, a connecting structure of an elastic hose of the present invention is composed of an elastic hose having an innermost layer, and a sticking layer mainly containing rubber or resin, which was applied to at least an inner circumference of its one end or both ends and composed of a tubular member for connection of a hose. The connecting structure of an elastic hose is characterized in that the end having the sticking layer on at least its inner circumference of the elastic hose is inserted into the tubular member for connection of a hose and that the end of the elastic hose is stuck to the tubular member for connection of a hose by the sticking layer.

In the resin hose and the connecting structure of the resin hose according to the present invention, the resin hose main body and the cylindrical member may be ones which have been usually used. For example, the resin hose main body may have a monolayered structure composed of nylon 11 or nylon 12, a double-layered structure where a fluororesin layer is provided to an inner circumference of a nylon type in order to improve gasoline-resistant transparency, and a multilayered structure where an outer layer composed of nylon, etc. is provided to an outer circumference of the double-layered structure. These structures may be linear, but a structure of an car hose generally has a flexible section.

In addition, as the cylindrical member, a pipe of a piping equipment may be used as long as it has a ring convex section on an outer circumference of an inserting section in order not to easily disconnect the connected resin hose, or a connecting coupling, such as a quick connector 5 having a ring convex section 51*a* on an inserting section 51 shown in FIG. 5, may be used. Furthermore, these cylindrical members may be made of metal or resin. The resin hose main body may have a flexible section 36 in its middle portion as shown in FIG. 5, or may have a flare structure where the outer circumference on the end of the resin hose main body 1 is spread outward as shown in FIG. 6 in order to ease insertion into the cylindrical member.

Meanwhile, the elastic hose of the present invention is an elastic hose whose innermost layer is made of resin and outside is made of rubber or another material. Especially, in the case of a fuel hose of a car engine, etc., it is preferable that its innermost layer is made of fluororesin (ETFE), vinylidene fluororesin, and polyamide resin. In the case of such a fuel hose, its innermost layer usually has a thickness of about 0.1 mm to 1 mm.

In addition, in the case of another desirable fuel hose, its inner tube has a double-layered structure, and its first layer (innermost layer) is made of fluororesin (ETFE) and acrylonitrile-butadiene rubber (NBR), hydrin lubber (ECO), chlorosulfonated polyethylene (CSM), chlorinated polyethylene (CPE), acrylic rubber (ACM), etc. are used as the second layer on the outside of the first layer. In general, a reinforcing layer composed of reinforcement, such as vinylon, polyester and aramid is provided to the outside of the second layer, and an outer tube made of the same materials as the second layer or a mixture of NBR and PVC is provided to the outside of the reinforcing layer.

The tubular member for connection of the elastic hose may be various pipe or the like of piping equipments, such as a metallic pipe provided to a piping equipment, such as a fuel strainer of a car engine, or may be a connecting coupling, such as a quick connector. Moreover, the tubular member for connection may be composed of metal or resin. Here, it is desirable that the tubular member for connection is provided with a ring convex section on an outer circumference of its inserting section in order not to easily disconnected the connected elastic hose.

For a fuller understanding of the nature and advantages of the invention, reference should be made to the ensuing detailed description taken in conjunction with the accompanying drawings.

PIG. 6 is a side view, with portions broken away for clarity, which shows another concrete example of the resin hose with the sticking layer of the present invention.

Figure 7:
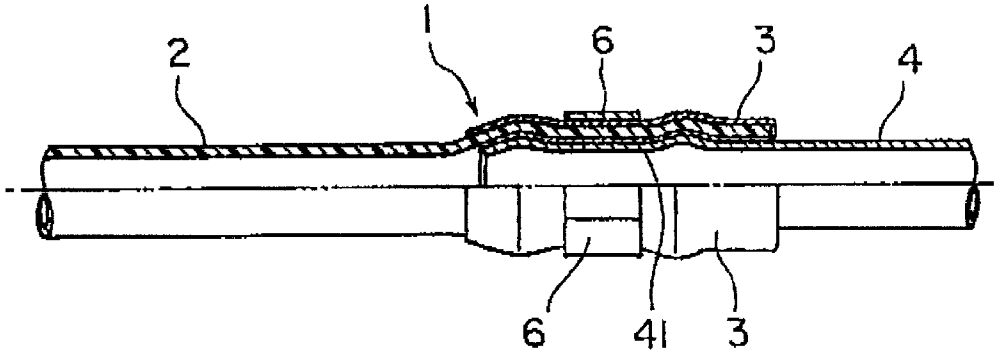

FIG. 7 is a side view, with portions broken away for clarity, which shows a concrete example of the connecting structure using the resin hose with the sticking layer of the present invention.

Figure 8:
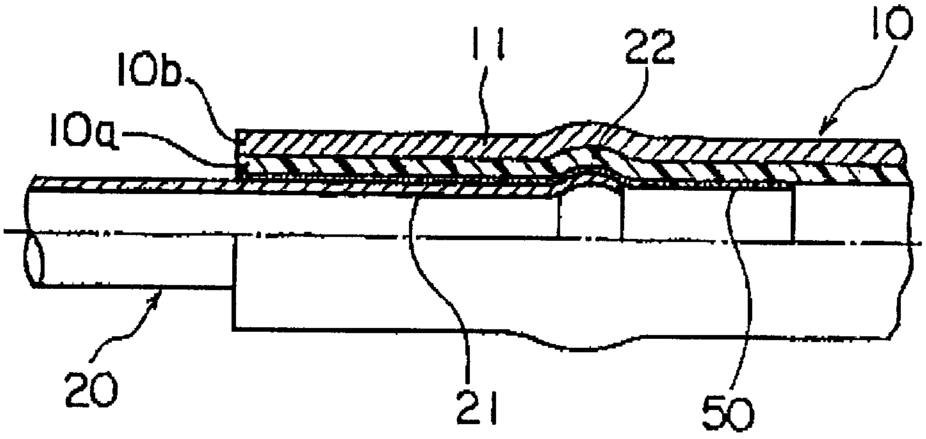

FIG. 8 is a schematic cross sectional view of a main part which shows one example of a connecting structure using the elastic hose with the sticking layer of the present invention directly connected to the metallic pipe provided to the piping equipment without using a coupling unit.

Figure 9:
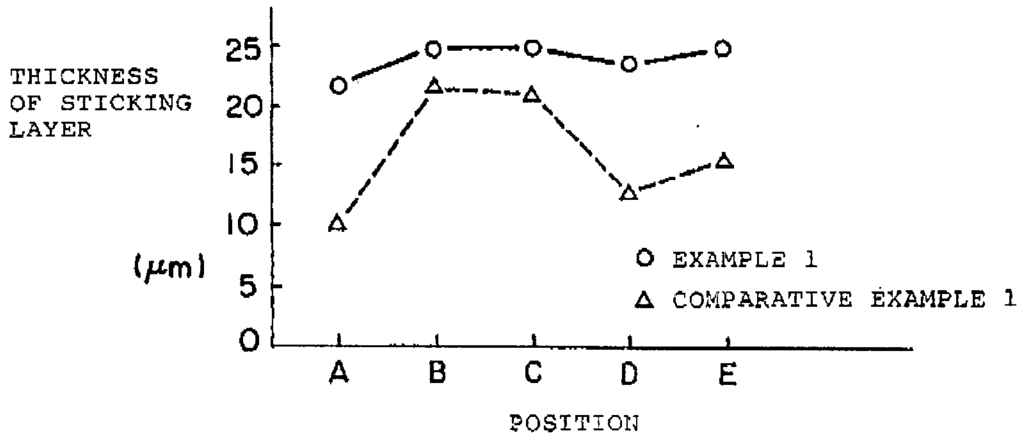

FIG. 9 is a graph which shows a dispersion of a thickness of sticking layers between the connecting structure using the resin hose with the sticking layer of the present invention and a connecting structure of a comparative example where a sticking layer is provided to an outer circumference of a cylindrical member.

Figure 10:
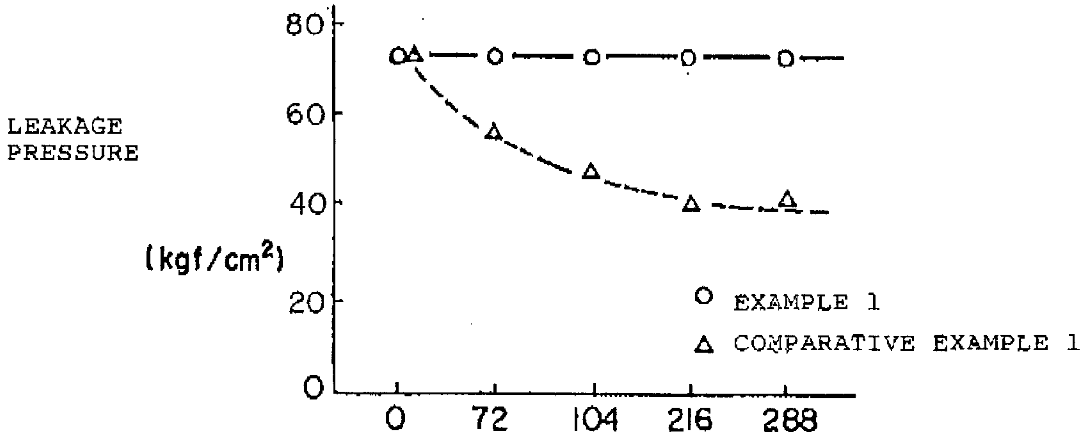

FIG. 10 is a graph which shows a relationship between aging time and sealing properties in the connecting structure using the resin hose with the sticking layer of the present invention and in the connecting structure of the comparative example where the sticking layer is provided to the outer circumference of the cylindrical member.

Figure 11:
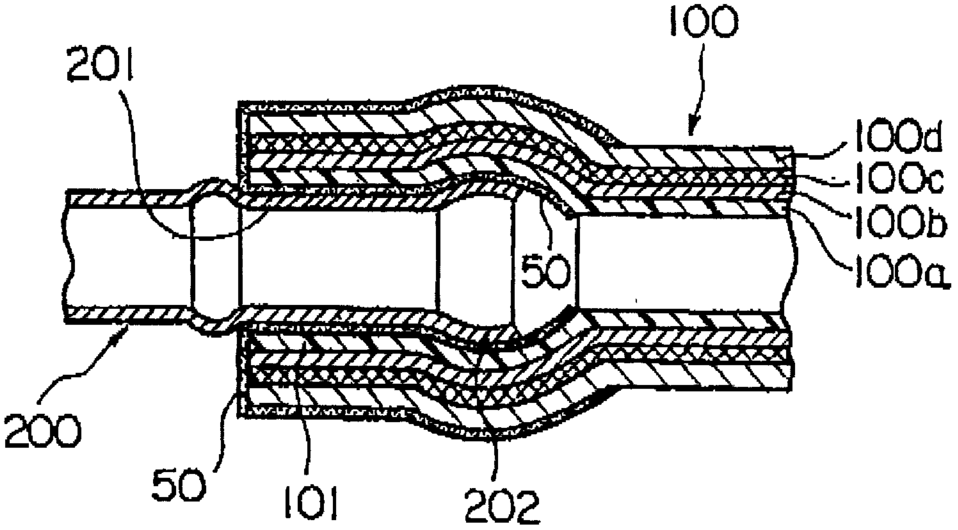

FIG. 11 is a schematic cross sectional view of a main portion which shows another concrete example of the connecting structure using the elastic hose with the sticking layer of the present invention directly connected to the metallic pipe provided to the piping equipment without using the coupling unit.

Figure 12:
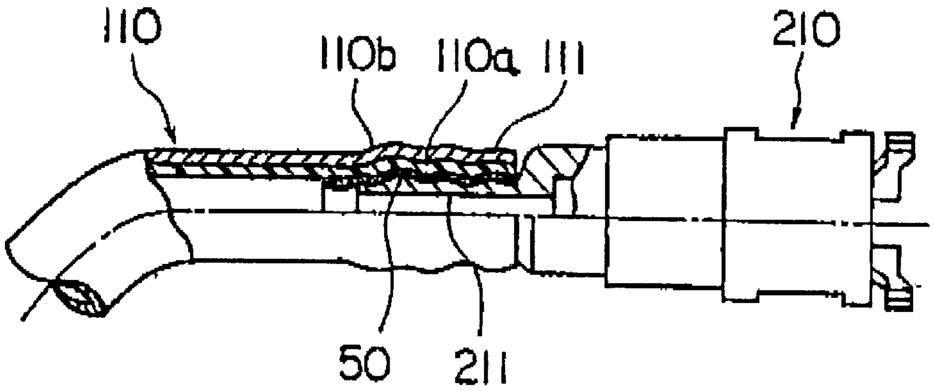

FIG. 12 is a schematic cross sectional view of a main portion which shows one concrete example of the connecting structure using the elastic hose with the sticking layer of the present invention directly connected to the metallic pipe of the connecting coupling.

DETAILED DESCRIPTION OF THE PREFERRED EMBODIMENT

The following describes embodiment of a resin hose with a sticking layer of the present invention and its connecting structure.

In the resin hose of the present invention, the sticking layer provided to the end of the resin hose is made of fluororubber, denatured silicone rubber, a phenolic resin coating agent or a silane coupling agent. Such sticking agents are diluted with a solvent, such as thinner, so as to have suitable viscosity, and they are applied to the end of the resin hose.

The application method is not necessarily limited, but dip application method for dipping the hose end in a sticking solution is easy. In this case, when the sticking agents are applied to an inner circumference, an outer circumference and an end surface of the hose end, the hose end may be simply dipped, and the sticking agents can be applied only to the inner circumference of the hose end by using, for example, a brush, a spray, etc.

The sticking layer applied to the resin hose is dried so that the solvent is evaporated, and the sticking layer is hardened to the extent that fluidity and peeling do not occur. Thereafter, in the case where fluororubber or denatured silicone rubber is used, the sticking layer is vulcanized or half-vulcanized by heating, and in the case where a phenolic resin coupling agent or a silane coupling agent is used, the resin hose end provided with the sticking layer is directly pressed into a cylindrical member. The sticking layer with a thickness of less than 1 $\mu$m is not effective, and if the thickness exceeds 200 $\mu$m, resistance in pressing is increased and thus it is difficult to press the resin hose end into the cylindrical member. Therefore, the thickness is usually in the range of 1 $\mu$m to 200 $\mu$m, but the range of 5 $\mu$m to 100 $\mu$m is preferable, and the range of 10 $\mu$m to 50 $\mu$m is more preferable.

Since the connecting structure using the resin hose with the sticking layer obtained in such a manner is provided with a sticking layer between the resin hose end and the inserting section of the cylindrical member, extremely excellent sealing properties are obtained. In other words, the sticking layer made of the fluororubber or the denatured silicone rubber is stuck to the cylindrical member due to the elastic effect, and when particularly a car hose, etc. is heated in using, the vulcanization further proceeds. As a result, the more excellent sealing properties can be achieved, Moreover, in the case of the phenolic resin coating agent or the silane coupling agent, after being pressed into the cylindrical member, the resin hose is heated so that the resin hose is stuck to the cylindrical member, thereby obtaining the excellent sealing properties.

Furthermore, since the inner circumference and the outer circumference of the resin hose are smooth, the sticking layer with the uniform thickness is easily applied, As a result, the sticking layer is not unevenly distributed between the resin hose and the cylindrical member, and there is no portion where the sticking layer does not exist or extremely thin sticking layer exists. For this reason, the sealing properties have no dispersion, and thus the connecting structure with high reliability can be obtained.

The sticking layer may be applied to at least the inner circumference of the resin hose end which contacts with the cylindrical member as mentioned above, but is is preferable that it is applied to the inner circumference, the outer circumference and the end surface of the resin hose so as to cover the resin hose end. This is because the sticking layer can be simply formed by the simple dip application, and as shown in FIG. 7, in the case where a fastener 6, such as rubber or metallic clamp, is placed on the end outer circumference of the end of a resin hose 1 inserted into an inserting section 41 of a cylindrical member 4 so that the resin hose 1 is pressed into the cylindrical member 4, the fastener 6 is securely placed to the outer circumference of the resin hose by the sticking layer 3 so that an maintenance-free arrangement can be obtained.

In addition, in the connecting structure using the resin hose with the sticking layer of the present invention, the excellent sealing properties can be achieved for a long period as mentioned above, but even if the sealing properties are lost in using, the excellent sealing properties can be recovered by at least replacing the resin hose with a new one with a sticking layer. Therefore, the cylindrical member can be continuously used.

The following describes embodiment of the elastic hose with the sticking layer of the present invention and its connecting structure.

In the elastic hose of the present invention, as shown in FIG. 8, a sticking layer 50 is formed by application on at least an inner circumference of an innermost layer 10*a* of one end 11 of an elastic hose 10 composed of the innermost layer 10*a* made of resin and an outer layer 10*b* made of rubber. As to the elastic hose 10 provided with the sticking layer 50, when the one end 11 is inserted into a tubular member for connection of a hose, such as an inserting section 21 of a metallic pipe 20 in a piping equipment, the sticking layer 50 provided to the inner circumference of the elastic hose is stuck to the outer circumference of the tubular member for connection of a hose, such as the metallic pipe 20, and its excellent sealing properties are obtained so that the elastic hose 10 is secured to the tubular member for connection of a hose.

Examples of the materials of the sticking layer formed at least on the inner circumference of the elastic hose end are a fluororubber coating agent, a phenolic resin coating agent, a silane coupling agent, a high polymer denatured silicone oil, fluorine, polyether, denature silicone rubber obtained by denaturing alcohol, etc., and a mixture of them. In particular, the fluororubber coating agent with excellent heat resistance, stickiness, gasoline resistance, etc. is preferable.

These sticking agents are diluted with a solvent so as to have a suitable viscosity, and is applied to the elastic hose. Example of methods for applying the sticking agent to the inner circumference of the innermost layer made of resin of the elastic hose are a method for applying the sticking agent to the inner circumference of the hose by pouring or spraying it from the hose end to the inside, a method for applying the sticking agent only to the inner circumference of one end or both the ends of the hose by inserting a brush, etc. coated with the sticking agent into one end or both the ends of the hose, and a method for applying the sticking agent to the inner circumference and the outer circumference including the end surface on the one end or both the ends by dipping only the one end or both the ends of the hose in the sticking agent composing the sticking layer.

The process for applying the sticking agent may be performed just before connecting of the hose, but it is preferable that the application process is previously performed in a hose factory. In other words, in the hose producing process, since the fluororubber coating agent and the phenolic resin coating agent can be easily subject to heat treatment after their application, the productivity is improved. Moreover, the heat treatment can prevent sticking of dusts etc. to the sticking layer while the elastic hose is being transported to an assembly plant.

The sticking layer formed on the elastic hose is dried so that the solvent is evaporated, and is hardened to the extent that fluidity and peeling do not occur. Thereafter, in the case where fluororubber or denatured silicone rubber is used, the sticking layer is vulcanized or half-vulcanized by heating, and in the case where a phenolic resin coupling agent, a high polymer denatured silicone oil or a silane coupling agent is used, the elastic hose end provided with the sticking layer is directly pressed into a tubular member for connection of an elastic hose.

In order to easily insert the elastic hose into the tubular member for connection of a hose, such as a pipe, it is preferable that a thickness of the sticking layer to be formed on the elastic hose is in the range of 1 μm to 200 μm, and more preferably in the range of 5 μm to 100 μm. The sticking layer with a thickness of less than 1 μm does not show its effect, and when the thickness exceeds 200 μm, resistance in pressing the elastic hose is increased, and thus the pressing of the elastic hose becomes difficult.

When the hose structure is arranged by inserting the end of the elastic hose with the sticking layer into the tubular member for connection of a hose in the above manner, the elastic hose end is stuck to the tubular member for connection of a hose by the sticking layer and simultaneously the excellent sealing properties are shown. In other words, the sticking layer made of a fluororubber coating agent or denatured silicone rubber is stuck to the tubular member by its excellent elastic effect, and particularly in a car hose, since it is heated in using, the sticking layer is further vulcanized, and thus the more excellent sealing properties and stickiness are achieved. Moreover, in the case where a phenolic resin coating agent, high polymer denatured silicone oil, or a silane coupling agent are used, after being inserted into the tubular member, the elastic hose is heated so as to be stuck to the tubular member, thereby obtaining the excellent sealing properties.

In order to further strengthen the contacting effect or the sticking effect by the sticking layer between the inner circumference of the resin innermost layer of the elastic hose and the tubular member for connection of a hose, the outer circumference of the tubular member for connection of a hose, such as a metallic pipe, can be also subject to surface treatment. As such surface treatment, for example, a method for perform chromate treatment after an gilt or ZnNi gilt is desirable.

Therefore, in accordance with the elastic hose of the present invention, needless to say, sufficient sealing properties are shown in initial use, and even if elastic force of the elastic hose is lowered after it is continuously used for a long time, the excellent sealing properties can be maintained by the contacting effect or the sticking effect between the inner circumference of the innermost layer of the elastic hose and the outer circumference of the tubular member for connection of a hose due to the sticking layer, thereby making it possible to achieve the maintenance-free arrangement.

Furthermore, since the inner circumference of the elastic hose is smooth, the sticking layer with an uniform thickness can be easily formed. As a result, the sticking layer is not unevenly distributed between the elastic hose and the tubular member, and there is no portion where the sticking layer does not exist or extremely thin sticking layer exists. For this reason, the sealing properties have no dispersion, and thus the connecting structure with high reliability can be obtained.

In addition, in the connecting structure using the elastic hose with the sticking layer of the present invention, the excellent sealing properties can be achieved for a long period as mentioned above, but even if the sealing properties are lost in using, the excellent sealing properties can be recovered by at least replacing the elastic hose with a new one with a sticking layer. Therefore, the tubular member can be continuously used.

[Embodiment 1]

As one embodiment of the resin hose with the sticking layer of the present invention, the following describes the case where a resin hose 1 provided with a sticking layer 3 on an end of a resin hose main body 2 is connected to a cylindrical member 4 composed of a metallic pipe. The resin hose main body 2 is a tube composed of monolayered nylon 11, and its inner diameter is 6.0 mm and its outer diameter is 8.0 mm. Meanwhile, the metallic pipe as the cylindrical member 4 has two ring convex sections **4*a* in an inserting section, and its whole surface was subject to surface treatment, such as Zn gilt, Zn—Ni gilt or fluororesin coat so that its outer diameter becomes 8.0 mm. Here, the outer diameter of the ring convex section 41*a*** is 8.8 mm.

First, an end **2*a* of the resin hose main body 2 was dipped in fluororubber, which was diluted in a solvent so as to have viscosity of about 100 cps, with the end 2*a* facing downward, and it was pulled up vertically. Thereafter, the sticking layer 3 applied to the end 2*a* was dried for 12 minutes at 70° C. with it facing downward, and after it was heated for 25 minutes at 160° C., the fluororubber of the sticking layer 3 was vulcanized or half-vulcanized. As a result, the sticking layer 3 made of fluororubber was formed on an inner circumference, an outer circumference and an end surface on the end 2***a* of the resin hose 2 so as to cover a distance of about 35 mm from their ends. The resin hose 1 provided with the sticking layer 3 on its end 2*a* was pressed into the inserting section of the cylindrical member 4 composed of the metallic pipe so that the connecting structure of the resin hose of the present invention was obtained.

As a comparative example, a cylindrical member composed of the same kind of a metallic pipe was used, and fluororubber as the sticking layer was applied to the outer circumference of the metallic pipe as the cylindrical member by dipping in the like manner of the above. Then, after being dived and heated, the fluororubber was vulcanized or half-vulcanized in the like manner of the above. Thereafter, an end (without sticking layer) of a resin hose main body composed of the monolayered nylon 11 was pressed into the inserting section of the cylindrical member provided with the sticking layer so that a connecting structure of the comparative example was produced.

Figure 1:
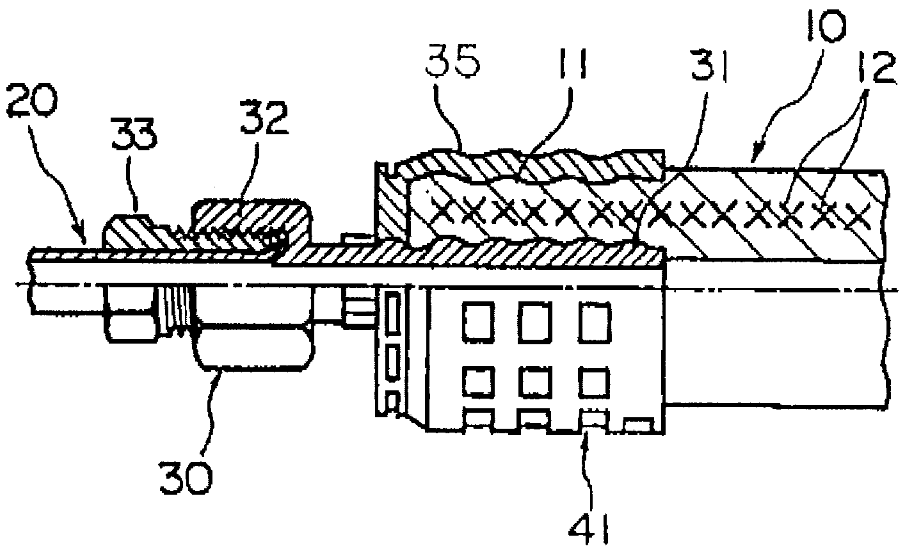
FIG. 1 is a schematic cross sectional view which shows a main part of a conventional connecting structure where an elastic hose is connected to a metallic pipe provided to a piping equipment by intervention of a coupling unit.
Figure 2:
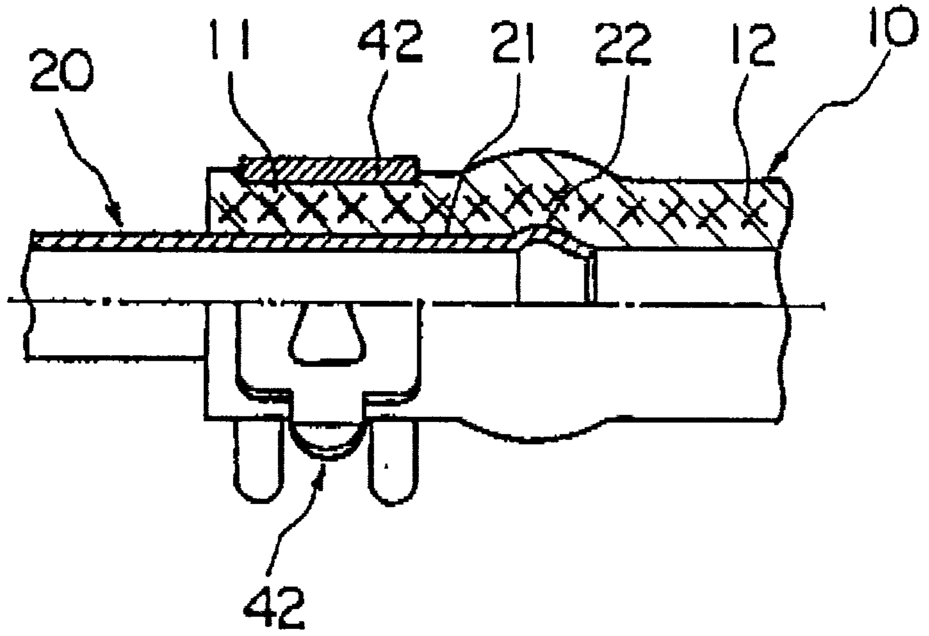
FIG. 2 is a schematic cross sectional view which shows a main part of a conventional connecting structure where an elastic hose is directly connected to a metallic pipe provided to a piping equipment without using a coupling unit.
Figure 3:
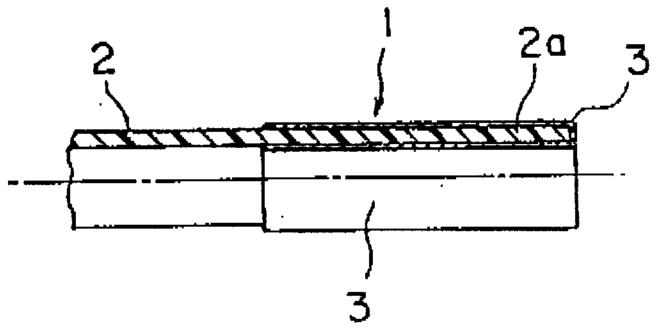
FIG. 3 is a side view, with portions broken away for clarity, which shows one concrete example of a resin hose with a sticking layer of the present invention.
Figure 4:
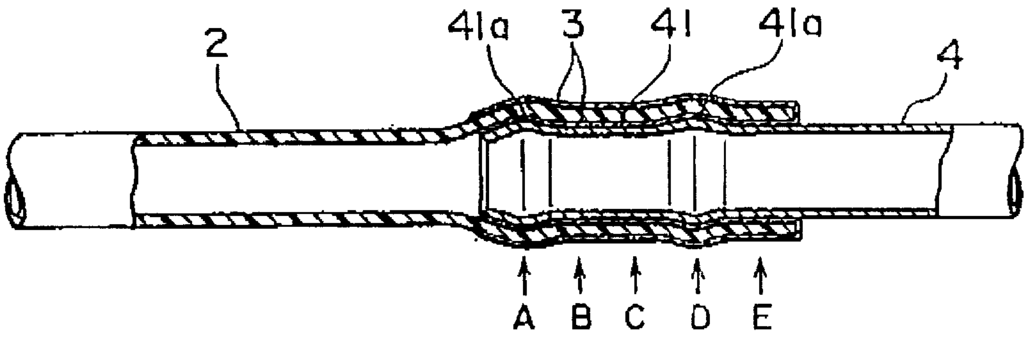
FIG. 4 is a side view, with portions broken away for clarity, which shows one concrete example of a connecting structure using the resin hose with the sticking layer of the present invention.
Figure 5:
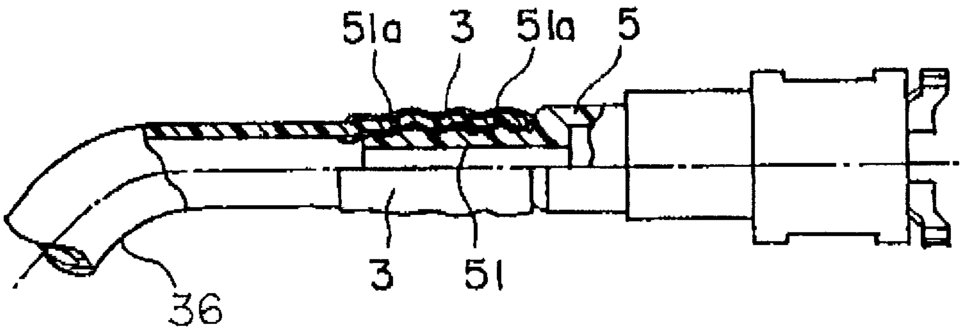
FIG. 5 is a side view, with portions broken away for clarity, which shows another concrete example of the connecting structure using the resin hose with the sticking layer of the present invention.
Figure 6:
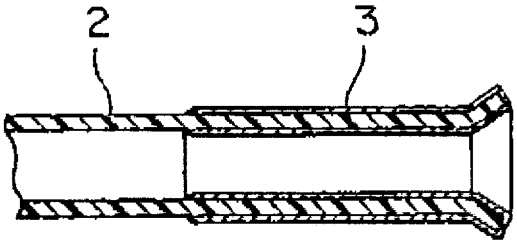

Each connecting structure of the present invention and the comparative example was cut in five portions shown in FIG. 4 (A, B, C, D and E), and these sections were visually inspected by means of a stereomicroscope so that each thickness of the sticking layer 3 existing between the inner circumference of the resin hose main body 2 and the outer circumference of the cylindrical member 4 was measured. The obtained results are shown in FIG. 9. In the comparative example, since the sticking layer was applied to the outer circumference of the cylindrical portion where the ring convex section exists, the thickness has great dispersion, so the top part of the ring convex section is thin. However, in the present invention, the thickness is uniform, namely, in the range of 20 μm to 25 μm.

Next, as to each connecting structure of the present embodiment and the comparative example obtained in the same manner as the above, a relationship between aging time and sealing properties of the resin hose with the sticking layer was evaluated. After the connecting structure was maintained in atmosphere of 120° C. for constant aging time, while one end of the connecting structure was closed, pressure is applied to the other end so that leakage pressure was measured. As is clear from FIG. 10 showing the results, in the connecting structure of the comparative example, as the aging time becomes longer, the leakage pressure becomes lower, but in the connecting structure of the present embodiment where the resin hose with the sticking layer is used, even if the aging time becomes longer, leakage does not occur until the resin hose is exploded at about 72 $kgf/cm^2$. Therefore, the sealing properties depend On the thickness of the resin hose, but even if pressure of about 80 $kgf/cm^2$ is applied, the resin hose maintains the excellent sealing properties for a long time.

[Embodiment 2]

The following describes embodiment of the elastic hose with the sticking layer of the present invention on reference to FIG. 11. In the hose connecting structure shown in FIG. 11, an elastic hose 100 is a fuel rubber hose of a car, and its inner layer has a double-layered structure composed of a fluororesin first layer 100*a* and an NBR second layer 100*b*. A reinforcing layer 100*c* containing reinforcement of polyester is formed on an outer circumference of the second layer 100*b*, and an outer circumference of the reinforcing layer 100*c* is coated with an outer layer 100*d* made of CSM.

The elastic hose 100 was obtained by cutting a long hose produced by vulcanization so as to have a prescribed length. After one end 101 of the elastic hose 100 was dipped in a fluororubber coating agent dissolved in a solvent and the agent was applied to an inner circumference, an outer circumference and an end surface of the one end 101 so that its thickness becomes 1 μm to 200 μm, the one end 101 was put into a hot stove at 150° C. for about 30 minutes so that the fluororubber coating agent was half vulcanized, and a sticking layer 50 composed of a coating layer was formed.

The one end 101 of the elastic hose 100 was pressed into an inserting section 201 of a metallic pipe 200, which was provided to a pressure regulator around a car engine, not shown. A ring convex section 202 was formed at the top of the inserting section 201 of the metallic pipe 200.

In the connecting structure between the elastic hose 100 and the metallic pipe 200 obtained in the above manner, when a car is driven daily, the sticking layer 50, which was provided to the inner circumference of the one end 101 of the elastic hose 100, gradually makes the outer circumference of the inserting section 201 of the metallic pipe 200 stick to the inner circumference of the one end 101 of the elastic hose 100 by heat of an engine room. As a result, it is confirmed by a long term durability aging test that the connecting structure using the elastic hose with the sticking layer can maintain excellent sealing properties for a long time.

[Embodiment 3]

As shown in FIG. 12, an elastic hose 110 with a deflection form, which was provided with the sticking layer 50 on its one end 111, was connected to an inserting section 211 of a cavity member 210 of a quick connector for connecting the elastic hose 110 to a fuel strainer (not shown) of a car engine. The elastic hose 110 has a double-layered structure, polyamide, such as nylon, is used for an innermost layer 110*a*, and chloroprene rubber (CR) is used for an outer layer 110*b*.

The fluororubber coating agent was previously applied to an inner circumference of one end 111 of the elastic hose 110 in the hose producing process, and the half-vulcanized sticking layer 50 was provided thereto. The one end 111 of the elastic hose 110 was pressed into the inserting section 211 of the cavity member 210 of the quick connector so that the connecting structure was obtained.

In the connecting structure between the elastic hose 110 and the cavity member 210 of the quick connector as a tubular member for connection obtained in the above manner, similarly to embodiment 1, when a car is driven daily, the sticking layer 50, which was provided to the inner circumference of the innermost layer 110*a* of the elastic hose 110, gradually makes the outer circumference of the inserting section 211 of the cavity member 210 of the quick connector stick to the inner circumference of the innermost layer 110*a* of the one end 111 of the elastic hose 110 by heat of an engine room. As a result, it was confirmed by the long term durability aging test that the connecting structure using the elastic hose with the sticking layer can maintain excellent sealing properties for a long time.

As a comparative example, the same cavity member of the quick connector was used, and the fluororubber coating agent as the sticking layer was applied to the outer circumference of the inserting section of the cavity member. After the inserting section was dried and heated so as to be half-vulcanized in the same manner as the above, the end of the elastic hose having the same double-layered structure as the above (without sticking layer) was pressed into the inserting section provided with the sticking layer, and a connecting structure of the comparative example was produced.

Each connecting structure of the present invention and the comparative example was cut on plural places of each connecting section, and these sections were visually inspected by means of a microscope so that each thickness of the sticking layer existing between the inner circumference of the elastic hose and the outer circumference of the inserting section of the cavity member of the quick connector was measured. As a result, in the comparative example, since the sticking layer was applied to the outer circumference of the inserting section where the ring convex section exists, the thickness has great dispersion, so the top part of the ring convex section is thin However, in the present invention, the thickness is approximately uniform.

Next, as to each connecting structure of the present embodiment and the comparative example obtained in the same manner as the above, a relationship between aging time and sealing properties of the elastic hose was evaluated. After the connecting structure was maintained in atmosphere of 120° C. for constant aging time, while one end of the connecting structure was closed, pressure is applied to the other end so that leakage pressure (pressure when leakage occurs) was measured. As a result, in the connecting structure of the comparative example, as the aging time becomes longer, the leakage pressure becomes lower, but in the connecting structure of the present embodiment using the elastic hose with the sticking layer, even if the aging time becomes longer, leakage does not occur until the elastic hose is exploded at about 70 $kgf/cm^2$. Therefore, the elastic hose maintains the excellent sealing properties for a long time.

As another embodiment, an intermediate layer made of hydrin lubber (ECO) was formed on the outer circumference of the innermost layer made of polyamide resin, such as nylon 11, and an outer layer composed of chlorinated polyethylene (CPS) was formed on the outer circumference of the intermediate layer so that an elastic hose was produced. The phenolic resin coating agent was applied to an inner circumference of the innermost layer on one end of the elastic hose, and the elastic hose was inserted into a tubular member for connection of a hose so that a connecting structure could be obtained.

Furthermore, as another embodiment, an outer circumference of an innermost layer made of vinylidene fluororesin was coated with a polyamide resin layer, such as nylon 12, and an outer circumference of the polyamide resin layer was coated with an intermediate layer made of chloroprene rubber (CR). Then, an outer circumference of the intermediate layer was coated with a reinforcing layer made of aramid fiber, and an outer circumference of the reinforcing layer was coated with an outer layer obtained by blending NBR and PVC so that an elastic hose was produced. The fluororubber coating agent was applied to the inner circumference of the innermost layer on one end of the elastic hose, and a connecting structure could be arranged by using the elastic hose similarly.

As mentioned above, in the present invention, when the sticking layer mainly containing rubber or resin for sticking the hose to the cylindrical member is provided to the end of the resin hose, and the sticking layer mainly containing rubber or resin is provided to the inner circumference of the end of the elastic hose whose innermost layer is made of resin, excellent sealing properties can be maintained for a long time when these hoses are connected to a pipe and a connecting coupling of a piping equipment, which is usually used. Even if the sealing properties are lost in using, the excellent sealing properties can be recovered by at least replacing the hoses.

The invention being thus described, it will be obvious that the same may be varied in many ways. Such variations are not to be regarded as a departure from the spirit and scope of the invention (for example, instead of a metallic pipe, a resin pipe can be used), and all such modifications as would be obvious to one skilled in the art are intended to be included within the scope of the following claims.

What is claimed is:

1. A hose with two ends and a sticking layer, wherein at least one end is stuck to a receptive tubular member, comprising:

a cylindrical hose main body made of a base layer at least having a monolayered an outer surface and said main body also having an inner surface, an outer surface of greater circumference and a flat annular surface at each end; and a sticking layer deposited at least on said inner surface of at least one end of said hose main body, wherein said sticking layer provides a seal when the sticking layer is in contact with the receptive tubular member and said sticking layer has an elastic effect and is composed of a material mainly containing rubber.

2. A hose with two ends and a sticking layer, wherein at least one end is connected to a receptive tubular member, comprising:

a cylindrical hose main body made of a base layer at least having a monolayered structure and said main body also having an inner surface, an outer surface of greater circumference and a flat annular surface at each end; and a sticking layer deposited at least on said inner surface of at least one end of said hose main body, wherein said sticking layer is composed of a material mainly containing resin.

3. The hose with a sticking layer according to claim 1 or 2, wherein said sticking layer is deposited on said flat annular surface, said inner surface and said outer surface of at least one end of said hose main body.

4. The hose with a sticking layer according to claim 1 or 2, wherein the sticking layer is deposited by a method selected from the group consisting of: dipping, pouring and applying the sticking material.

5. The hose with a sticking layer according to claim 1 or 2, wherein the sticking layer is deposited just before connecting the hose to the receptive tubular member.

6. The hose with a sticking layer according to claim 1 or 2, wherein said base layer is composed of resin.

7. The hose with a sticking layer according to claim 6, wherein said cylindrical hose main body has a deflection section.

8. The hose with a sticking layer according to claim 6, wherein said cylindrical hose main body has a flare structure on the end of the hose main body which is spread outward.

9. The hose with a sticking layer according to claim 6, wherein said sticking layer is made of a material selected from the group consisting of: fluororubber, denatured silicone rubber, a phenolic resin coating agent or a silane coupling agent.

10. The hose with a sticking layer according to claim 6, wherein said sticking layer has a thickness of 1 $\mu$m to 100 $\mu$m.

11. The hose with a sticking layer according to claim 1 or 2, wherein an innermost layer of said base layer is composed of resin; and an outer layer of said base layer is composed of rubber; and the hose main body has elasticity.

12. The hose with a sticking layer according to claim 11, wherein said sticking layer is made of at least one material selected from the group consisting of: fluororubber coating agent, a phenolic resin coating agent, a silane coupling agent, a high polymer denatured silicone oil and a denatured silicone rubber.

13. The hose with a sticking layer according to claim 11, wherein said sticking layer has a thickness of 1 μm to 200 μm.

14. The hose with a sticking layer according to claim 11, wherein said innermost layer is made of at least one resin selected from the group consisting of: fluororesin, vinylidene fluororesin and polyamide resin.

15. The hose with a sticking layer according to claim 11, wherein a reinforcing layer is provided on an outer circumference of the outer layer of said base layer;

said reinforcing layer is formed of a reinforcement made of a material selected from vinylon, polyester and aramid.

16. A connecting structure with a sticking layer comprising:

a hose with a sticking layer, said hose having:

a cylindrical hose main body made of a base layer at least having a monolayered structure and said main body also having an inner surface, an outer surface of greater circumference and a flat annular surface at each end; and a sticking layer deposited at least on said inner surface of at least one end of said hose main body, wherein said sticking layer provides a seal when the sticking layer is in contact with a receptive tubular member and said sticking layer has an elastic effect and is composed of a material mainly containing rubber;

the receptive tubular member, wherein a ring convex section is provided on an outer surface of its end for connecting of a hose, wherein the end with the sticking layer of said hose with the sticking layer is filled to the end for connecting of a hoco of said receptive tubular member; and the end of the hose is stuck to the tubular member by said sticking layer.

17. A connecting structure with a sticking layer comprising:

a hose with a sticking layer, said hose having:

a cylindrical hose main body made of a base layer at least having a monolayered structure and said main body also having an inner surface, an outer surface of greater circumference and a flat annular surface at each end; and a sticking layer deposited at least on said inner surface of at least one end of said hose main body, wherein said sticking layer is composed of a material mainly containing resin;

a receptive tubular member, wherein a ring convex section is provided on an outer surface of its end for connecting of a hose, wherein the end with the sticking layer of said hose with the sticking layer is fitted to the end for connecting of a hose of said receptive tubular member; and the end of the hose is stuck to the tubular member by said sticking layer.

18. The connecting structure of a hose with a sticking layer according to claim 16 or 17, wherein said receptive tubular member is formed of a material selected from metal and resin.

19. The connecting structure of a hose with a sticking layer according to claim 16 or 17, wherein said sticking layer is deposited on the inner surface, the outer surface and the flat annual surface of at least one end of the hose main body.

20. The connecting structure of a hose with a sticking layer according to claim 16 or 17, within the outer surface of the receptive tubular member is subject to surface treatment.

21. The connecting structure of a hose with a sticking layer according to claim 20, wherein said surface treatment is a treatment selected from the ground consisting of: chromate treatment, Zn gilt and ZnNi gilt.

22. The connecting structure of a hose with a sticking layer according to claim 16 or 17 that has sealing ability as illustrated in FIG. 10.

23. The connecting structure of a hose with a sticking layer according to claim 16 or 17, wherein the base layer of said cylindrical hose main body is composed of resin.

24. The connecting structure of a hose with a sticking layer according claim 23, wherein said cylindrical hose main body has a deflection section; and a fastener is placed on an outer surface of the end of the hose which is fitted to the end for connecting of a hose of said receptive tubular member.

25. The connecting structure of a hose with a sticking layer according to claim 16 or 17, wherein an innermost layer of the base layer is composed of resin; and an outer layer of said base layer is composed of rubber; and the hose main body has elasticity.

* * * * *